US011292302B2

(12) United States Patent
Gonsowski et al.

(10) Patent No.: US 11,292,302 B2
(45) Date of Patent: Apr. 5, 2022

(54) ELECTRIFIED AIR SYSTEM FOR USE WITH CENTRAL TIRE INFLATION SYSTEM

(71) Applicant: Deere & Company, Moline, IL (US)

(72) Inventors: Joseph R. Gonsowski, Buckingham, IA (US); Pratir Punjani, Waterloo, IA (US); Brian Bratvold, New Hartford, IA (US)

(73) Assignee: DEERE & COMPANY, Moline, IL (US)

( * ) Notice: Subject to any disclaimer, the term of this patent is extended or adjusted under 35 U.S.C. 154(b) by 234 days.

(21) Appl. No.: 16/533,505

(22) Filed: Aug. 6, 2019

(65) Prior Publication Data

US 2021/0039453 A1 Feb. 11, 2021

(51) Int. Cl.
*B60C 23/14* (2006.01)
*B60W 10/30* (2006.01)
*F02D 41/00* (2006.01)
*F04B 35/00* (2006.01)

(52) U.S. Cl.
CPC ............ *B60C 23/14* (2013.01); *B60W 10/30* (2013.01); *F02D 41/0002* (2013.01); *F04B 35/002* (2013.01)

(58) Field of Classification Search
CPC ........ B60C 23/10; B60C 23/14; B60W 10/30; F02D 41/0002; F04B 35/002
See application file for complete search history.

(56) References Cited

U.S. PATENT DOCUMENTS

| 1,800,780 | A | * | 4/1931 | Richard | ................ B60C 23/003 |
| | | | | | 152/417 |
| 2,634,782 | A | * | 4/1953 | Firth, Sr. | ............... B60C 23/003 |
| | | | | | 152/417 |
| 4,418,737 | A | * | 12/1983 | Goodell | ................. B60C 23/00 |
| | | | | | 137/224 |
| 4,622,817 | A | | 11/1986 | Kobayashi | |
| 4,745,754 | A | | 5/1988 | Kawamura | |
| 4,745,755 | A | | 5/1988 | Kawamura | |
| 4,817,387 | A | | 4/1989 | Lashbrook | |
| 6,557,347 | B1 | | 5/2003 | Alvarez et al. | |
| 6,568,173 | B1 | | 5/2003 | Kolmanovsky et al. | |
| 6,871,498 | B1 | | 3/2005 | Allen et al. | |
| 7,178,327 | B2 | | 2/2007 | Miyashita | |
| 10,926,588 | B2 | * | 2/2021 | Fiorati | .................. B60C 23/003 |

(Continued)

OTHER PUBLICATIONS

European Search Report issued in counterpart application No. 20189915.0 dated Oct. 12, 2020 (13 pages).

(Continued)

*Primary Examiner* — Carl C Staubach
(74) *Attorney, Agent, or Firm* — Michael Best & Friedrich LLP (57) ABSTRACT

A vehicle having one or more inflatable wheels, the vehicle including an internal combustion engine including a cylinder, a tire inflation system in fluid communication with and configured to selectively direct compressed air into at least one wheel of the one or more inflatable wheels, a compressor assembly having an outlet, where the compressor assembly is operable in a first mode, in which the outlet is in fluid communication with the cylinder of the internal combustion engine, and a second mode, in which the outlet is in fluid communication with the tire inflation system.

16 Claims, 11 Drawing Sheets

(56) References Cited

U.S. PATENT DOCUMENTS

| | | | |
|---|---|---|---|
| 2002/0116925 A1 | 8/2002 | Hampson et al. | |
| 2002/0121323 A1* | 9/2002 | Tarasinski | B60C 23/003 |
| | | | 152/416 |
| 2005/0155348 A1 | 7/2005 | Inoue | |
| 2007/0144171 A1* | 6/2007 | Tarasinski | F02B 37/24 |
| | | | 60/602 |
| 2008/0121218 A1 | 5/2008 | Algrain | |
| 2009/0198432 A1 | 8/2009 | Tabata et al. | |
| 2010/0107632 A1 | 5/2010 | Wu et al. | |
| 2010/0263639 A1 | 10/2010 | Uhrich et al. | |
| 2011/0222289 A1 | 9/2011 | Yamamoto et al. | |
| 2012/0297767 A1 | 11/2012 | Hofbauer | |
| 2013/0298554 A1 | 11/2013 | Sellnau | |
| 2013/0340429 A1 | 12/2013 | Desai et al. | |
| 2014/0090374 A1 | 4/2014 | Chavannavar | |
| 2014/0144412 A1 | 5/2014 | An et al. | |
| 2014/0230430 A1 | 8/2014 | Krug et al. | |
| 2015/0007563 A1 | 1/2015 | Wade | |
| 2016/0061102 A1 | 3/2016 | Sugiyama | |
| 2016/0237931 A1 | 8/2016 | Pappenheimer et al. | |
| 2017/0184038 A1 | 6/2017 | Garrard et al. | |
| 2018/0112633 A1 | 4/2018 | Keating et al. | |
| 2018/0223751 A1* | 8/2018 | Xiao | B60C 23/14 |
| 2018/0236827 A1* | 8/2018 | Breneman | F02B 33/00 |
| 2018/0297422 A1* | 10/2018 | Ciovnicu | B60C 23/003 |
| 2019/0070907 A1* | 3/2019 | Dudar | B60C 23/003 |
| 2020/0165990 A1 | 5/2020 | Heinisch et al. | |
| 2020/0173354 A1* | 6/2020 | Punjani | F02B 39/16 |
| 2021/0039454 A1* | 2/2021 | Gonsowski | F04D 17/12 |

OTHER PUBLICATIONS

European Search Report issued in counterpart application No. 20189910.1 dated Oct. 9, 2020 (15 pages).

European Search Report issued in counterpart application No. 20189918.4 dated Oct. 12, 2020 (11 pages).

\* cited by examiner

ELECTRIFIED AIR SYSTEM FOR USE WITH CENTRAL TIRE INFLATION SYSTEM

FIELD OF THE INVENTION

The present disclosure relates to an electrified air system (EAS), and more specifically to an EAS for use with a central tire inflation system (CTIS).

BACKGROUND

Some vehicle, such as tractors, utilize a CTIS to allow for the inflation and deflation of pneumatic wheels on-demand. CTIS systems typically include a built-in or dedicated air compressor to provide air for these tasks.

SUMMARY

In one aspect, a vehicle having one or more inflatable wheels, the vehicle including an internal combustion engine including a cylinder, a tire inflation system in fluid communication with and configured to selectively direct compressed air into at least one wheel of the one or more inflatable wheels, a compressor assembly having an outlet, where the compressor assembly is operable in a first mode, in which the outlet is in fluid communication with the cylinder of the internal combustion engine, and a second mode, in which the outlet is in fluid communication with the tire inflation system.

In another aspect, an intake assembly for use with a vehicle having an internal combustion engine including at least one cylinder, and a tire inflation system. The intake assembly including a compressor assembly having housing with an inlet and an outlet, the compressor assembly also including a compressor wheel at least partially positioned within and rotatable with respect to the compressor housing, and where the compressor assembly is operable independently of the internal combustion engine, and a manifold. Where the manifold includes a first passageway configured to be open to and in fluid communication with the at least one cylinder of the internal combustion engine, a second passageway configured to be open to and in fluid communication with the tire inflation system, a first valve having a first opening in constant fluid communication with the inlet of the compressor assembly, and a second opening in constant fluid communication with the first passageway, where the first valve is adjustable between an open configuration, in which the first opening is in fluid communication with the second opening, and a closed configuration, in which the first opening is not in fluid communication with the second opening, a second valve having a third opening in constant fluid communication with the outlet of the compressor assembly, and a fourth opening in constant fluid communication with the first passageway, where the second valve is adjustable between an open configuration, in which the third opening is in fluid communication with the fourth opening, and a closed configuration, in which the third opening is not in fluid communication with the fourth opening, and where the second passageway is in fluid communication with the outlet of the compressor assembly.

In another aspect, a manifold for use with a vehicle having an internal combustion engine including at least one cylinder, a compressor assembly having an inlet and an outlet, and a tire inflation system, the manifold including a first passageway configured to be open to and in fluid communication with the at least one cylinder of the internal combustion engine, a second passageway configured to be open to and in fluid communication with the tire inflation system, a third passageway configured to be open to and in fluid communication with the inlet of the compressor assembly, a fourth passageway configured to be open to and in fluid communication with the outlet of the compressor assembly, a first valve having a first opening in constant fluid communication with the third passageway, and a second opening in constant fluid communication with the first passageway, where the first valve is adjustable between an open configuration, in which the first opening is in fluid communication with the second opening, and a closed configuration, in which the first opening is not in fluid communication with the second opening, a second valve having a third opening in constant fluid communication with the fourth passageway, and a fourth opening in constant fluid communication with the first passageway, where the second valve is adjustable between an open configuration, in which the third opening is in fluid communication with the fourth opening, and a closed configuration, in which the third opening is not in fluid communication with the fourth opening, and where the second passageway is in fluid communication with the fourth passageway.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure generally relates to a vehicle having a central tire inflation system (CTIS) in operable communication with the electrified air system (EAS) of an internal combustion engine (ICE). More specifically, the EAS is configured to selectively provide compressed air at a pressure greater than atmospheric pressure to both the central tire inflation system and/or the intake manifold (e.g., the cylinders) of the ICE. In the illustrated implementation, the EAS is used to supplement the dedicated air compressor of the CTIS for quicker and more efficient operation. In other implementation, the EAS may act as the sole compressed air source for the CTIS.

Figure 1:
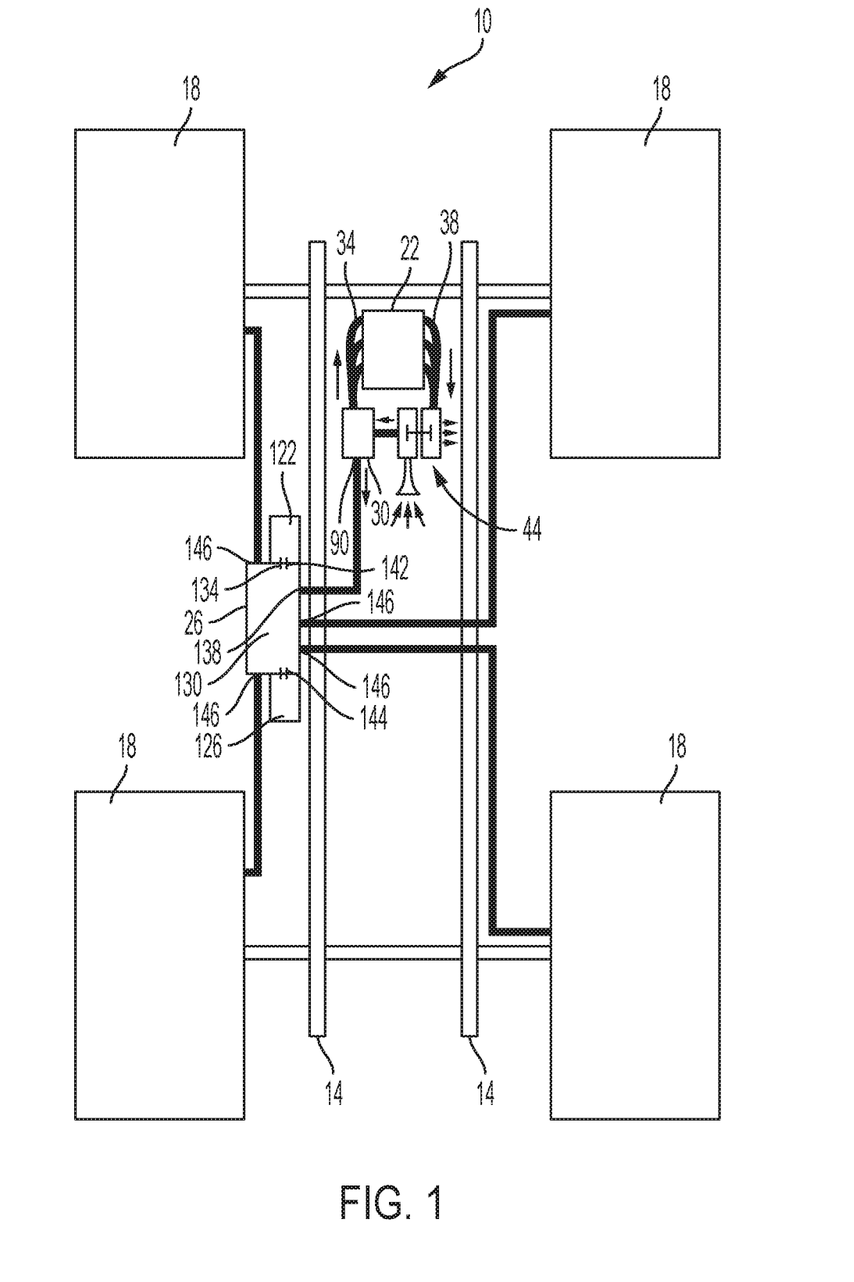
FIG. 1 is a schematic view of a vehicle having an EAS in operable communication with a CTIS.

Referring to FIG. 1, a vehicle 10 includes a frame 14, one or more pneumatic wheels 18 rotatably coupled to the frame 14, and an ICE 22 coupled to the frame 14. The vehicle 10 also includes a CTIS 26 in fluid communication with at least one of the one or more pneumatic wheels 18, and an EAS 30 in operable communication with both the ICE 22 and the CTIS 26. In the illustrated implementation, the illustrated vehicle 10 is a tractor having four pneumatic wheels 18 (e.g., rubber tires mounted on metallic rims). In alternative implementations, other forms of vehicle may be used having a different number and type of wheel. In still other implementations, only a subset of the wheels may be pneumatic or in operable communication with the CTIS 26.

The ICE 22 of the vehicle 10 includes one or more cylinders (not shown), an intake manifold 34 in operable communication with the one or more cylinders, an exhaust manifold 38 in operable communication with the one or more cylinders, and a crank shaft (not shown) as is well known in the art. During use, air is directed into the intake manifold 34 where it is subsequently distributed into each of the one or more cylinders, the ICE 22 then mixes fuel with the air to rotate the crank shaft via combustion. Finally, the ICE 22 expels the resulting heated exhaust gasses into the exhaust manifold 38 as is well known in the art.

In the illustrated implementation, the ICE 22 also includes a primary intake system 44 positioned upstream of the intake manifold 34 and configured to act as a throttle for the ICE 22 and provide intake air thereto (e.g., via the EAS 30). More specifically, the primary intake system 44 of the ICE 22 includes a pair of sequential turbochargers 48a, 48b driven by the exhaust manifold 38 (see FIG. 2) and configured to output a compressed airflow therefrom. In alternative implementations, the primary intake system 44 system may include a supercharger or a single turbocharger. In still other implementations, the primary intake system 44 may include a throttle body (not shown) or an air filter (not shown).

Illustrated in FIGS. 2-5, the EAS 30 of the vehicle 10 includes an EAS manifold 42, and an electrically assisted compressor assembly 46 in fluid communication with the manifold 42. During use, the EAS 30 receives airflow from the primary intake system 44, selectively compresses the airflow, and selectively directs the resulting airflow at a first pressure higher than atmospheric pressure to at least one of the intake manifold 34 and the CTIS 26. In the illustrated implementation, the EAS 30 is operable independently of both the CTIS 26 and the ICE 22.

The compressor assembly 46 of the EAS 30 includes a compressor housing 50, a compressor wheel 54 at least partially positioned within and rotatable with respect to the compressor housing 50, and a motor unit 58 coupled to the compressor wheel 54 and configured to selectively rotate the compressor wheel 54 relative to the compressor housing 50. The compressor housing 50, in turn, includes a compressor inlet 62, and a compressor outlet 66. During use, rotating the compressor wheel 54 relative to the compressor housing 50 draws air into the compressor housing 50 via the compressor inlet 62, compresses the air, and exhausts the resulting compressed air through the compressor outlet 66. As is well known in the art, the level of compression provided by the compressor assembly 46 can be varied by changing the speed at which the compressor wheel 54 rotates relative to the compressor housing 50. While not shown, the compressor assembly 46 may also include a turbine assembly configured to harness exhaust gasses from the exhaust manifold 38 to rotate the compressor wheel 54 relative to the compressor housing 50. In such implementations, the turbine assembly may be used to supplement the torque provided by the motor unit 58 (described below).

Figure 2:
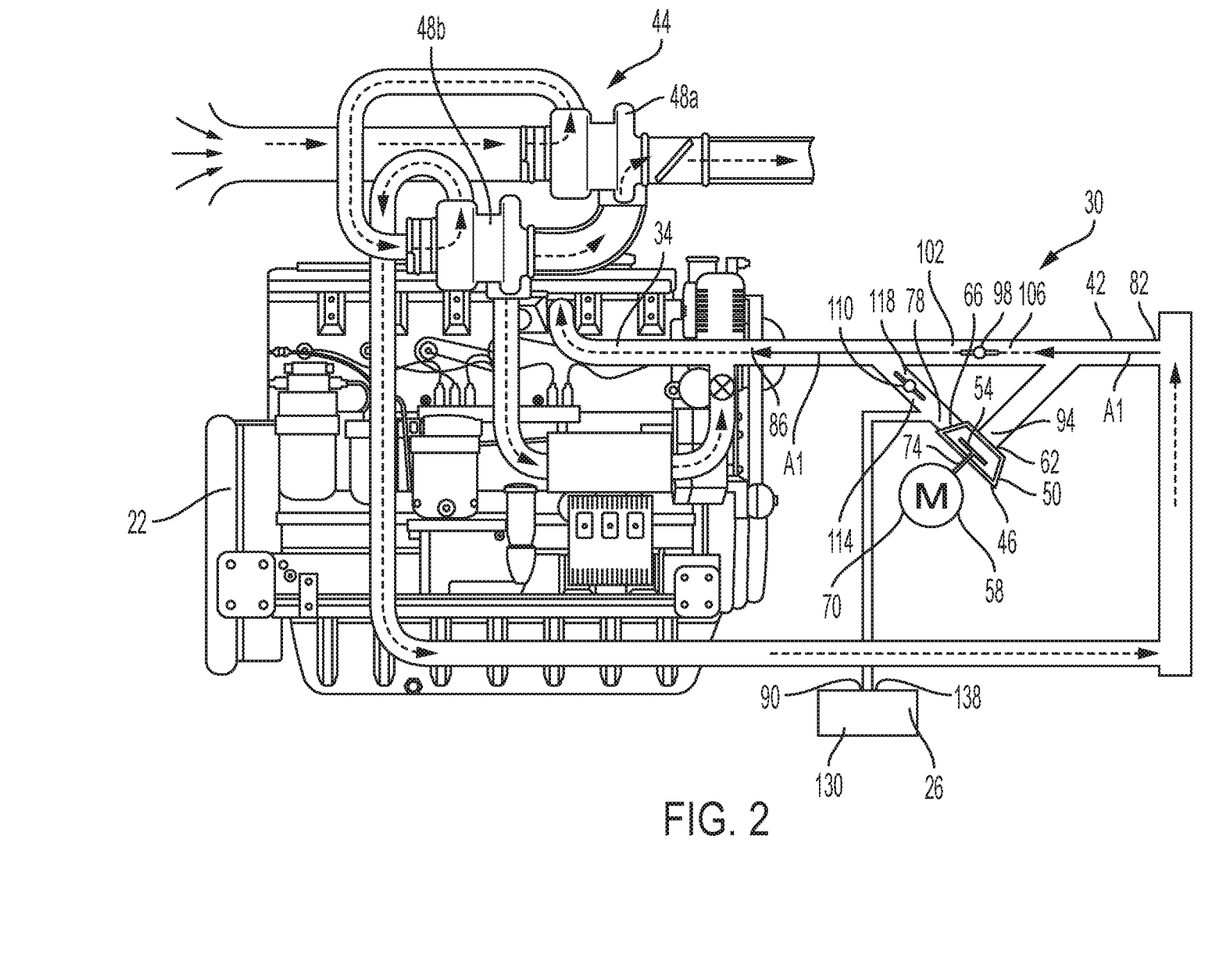
FIG. 2 is a schematic of the EAS of FIG. 1 in a passive mode.

The motor unit 58 of the compressor assembly 46 includes a body 70 fixed relative to the compressor housing 50, and an output shaft 74 rotatable with respect to the body 70. As shown in FIG. 2, the output shaft 74 is coupled to the compressor wheel 54 such that the shaft 74 and compressor wheel 54 rotate together as a unit. During use, the motor 58 is operable in a an activated mode, in which the motor 58 receives electrical energy (e.g., from a controller, not shown) causing the shaft 74 to rotate relative to the body 70, and therefore, the compressor wheel 54 to rotate relative to the compressor housing 50. The motor 58 is also operable in a deactivated mode, in which the shaft 74 is not driven relative to the body 70, and therefore, the compressor wheel 54 does not rotate relative to the compressor housing 50. In some implementations, the rotating speed of the motor 58 may also be adjustable allowing the EAS 30 to vary the level of compression provided by the compressor assembly during operation (described above). While the illustrated implementation includes an electrical motor, in other implementations the motor unit may be a motor-generator, a pneumatic motor, a hydraulic motor, and the like.

The manifold 42 of the EAS 30 includes a series of passageways and valves selectively interconnecting the ICE 22, the compressor assembly 46, the CTIS 26, and the primary intake system 44. More specifically, the manifold 42 includes a first opening or passageway 78 open to and configured to receive airflow from the compressor outlet 66, a second opening or passageway 82 open to and configured to receive airflow from the primary intake system 44, a third opening or passageway 86 open to and configured to provide airflow to the intake manifold 34 or cylinders of the ICE 22, a fourth opening or passageway 90 open to and configured to provide airflow to the CTIS 26, and a fifth opening or passageway 94 open to and configured to provide airflow to the compressor inlet 62.

The manifold 42 of the EAS 30 also include a first or bypass valve 98. The first valve 98 has a first end 102 open to and in fluid communication with the first opening 78 (e.g., the compressor outlet 66) and the third opening 86 (e.g., the intake manifold 34). The first valve 98 also includes a second end 106 open to and in fluid communication with the fifth opening 94 (e.g., the compressor inlet 62) and the second opening 82 (e.g., the primary intake system 44).

During use, the first valve 98 is adjustable between an open configuration (see FIG. 2), in which the first end 102 is in fluid communication with the second end 106 via the valve (e.g., the valve gate is open), and a closed configuration (see FIG. 3), in which the first end 102 is not in fluid communication with the second end 106 via the valve (e.g., the valve gate is closed). Generally speaking, the first valve 98 is configured to act as a bypass in the open configuration, allowing at least a portion of the air from the primary intake system 44 to bypass the compressor assembly 46 and flow directly into the intake manifold 34 and cylinders of the ICE 22 (see FIG. 4). In contrast, placing the first valve 98 in the closed configuration forces the airflow from the primary intake system 44 to flow into the compressor assembly 46 (see FIG. 3).

Figure 6:
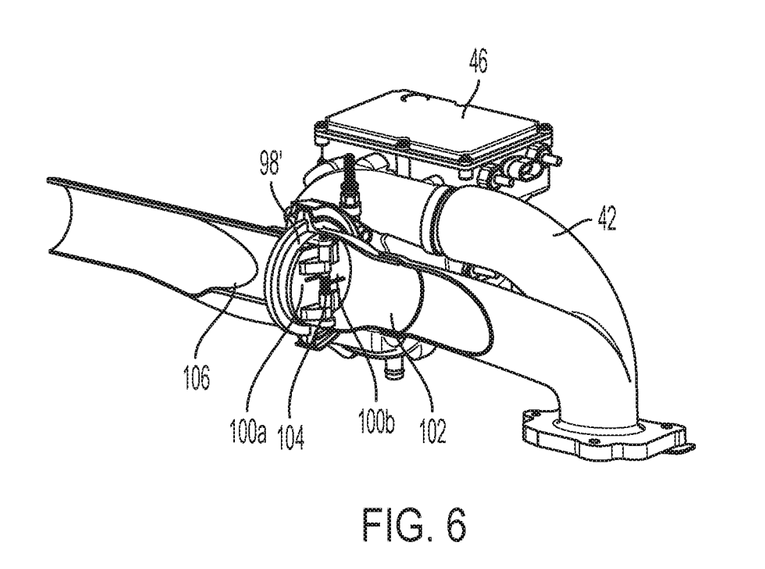
FIGS. 6 and 7 illustrate another implementation of a bypass valve.
Figure 7:
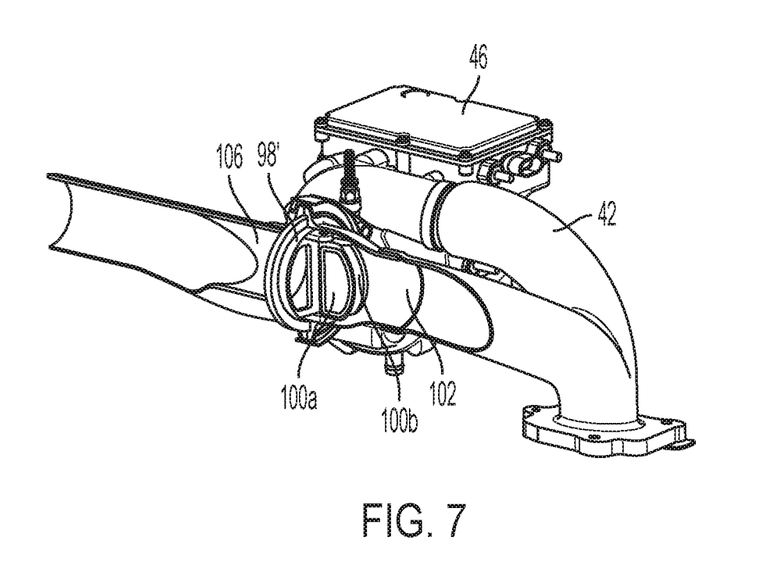
Figure 8:
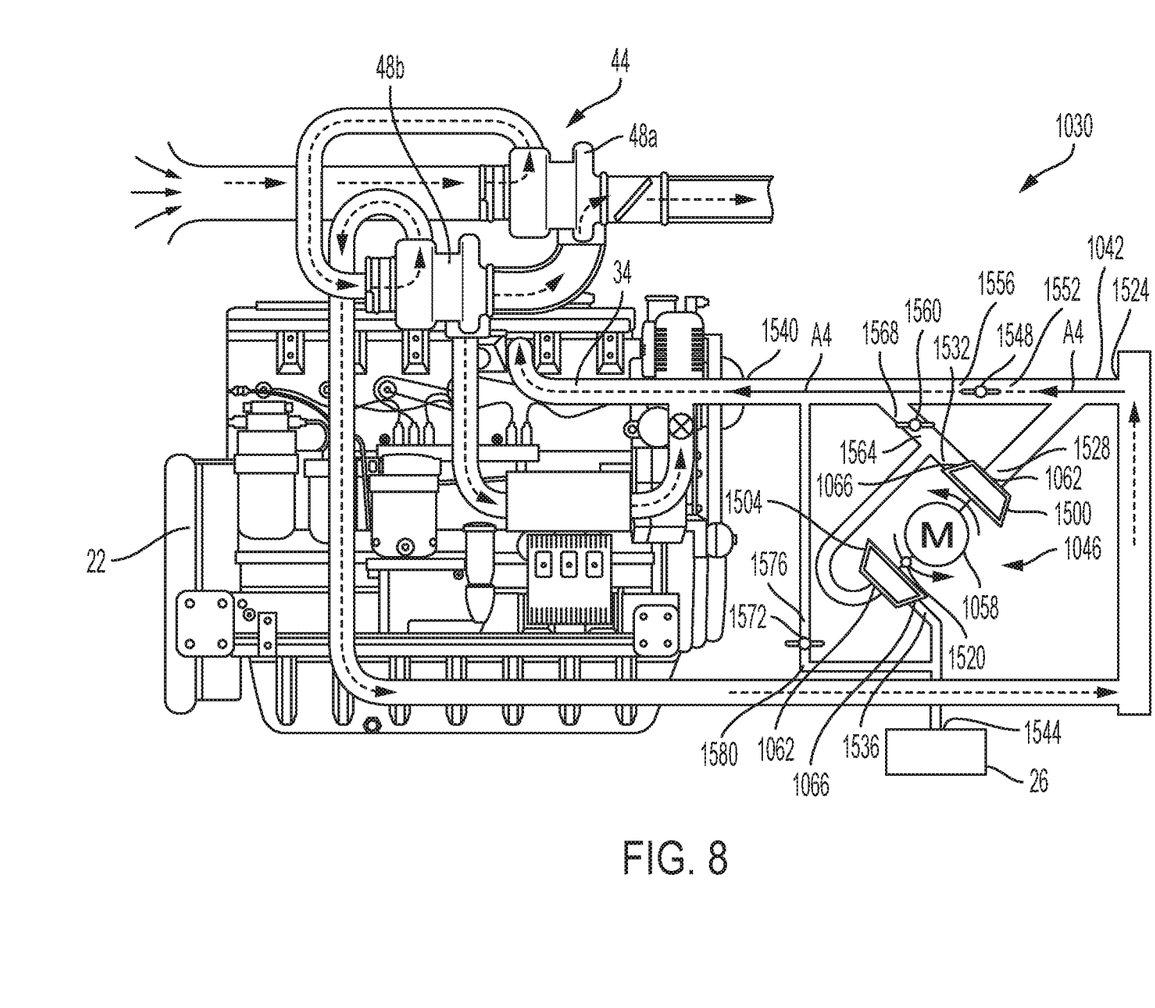
FIG. 8 is a schematic of another implementation of an EAS in a passive mode.

In the illustrated implementation the first valve 98 is an automatically controlled butterfly valve adjustable between the open and closed configurations using a controller (not shown). However, in alternative implementations, the valve 98 may be mechanically operated. For example, another implementation of the bypass valve 98' included a spring loaded, one-way valve (see FIGS. 6 and 7). In such an implementation, the bypass valve 98' may include a pair of pivotable disks 100a, 100b that are biased toward a closed configuration (described above; see FIG. 6) by a spring 104. As such, the bypass valve 98' remains in the closed configuration until the fluid pressure at the second end 106 exceeds the fluid pressure at the first end 102 (i.e., the valve pressure differential) by a predetermined amount (i.e., the pressure differential activation level). Once the pressure differential is sufficiently large, the disks 100a, 100b overcome the resistance of the spring 104 and open, placing the valve 98' in the open configuration. Generally speaking, operation of the compressor assembly 46 sufficiently reduces the pressure at the second end 106 relative to the first end 102 causing the valve 98' to remain closed. In contrast, deactivating the compressor assembly 46 during operation of the ICE 22 causes the pressure differential to increase beyond the pressure differential activation level, causing the valve 98' to open.

The manifold 42 of the EAS 30 also includes a second or CTIS feed valve 110. The second valve 110 includes a first end 114 open to and in fluid communication with both the first opening 78 (e.g., the compressor outlet 66) and the fourth opening 90 (e.g., the CTIS 26). The second valve 110 also includes a second end 118 open to and in fluid communication with the third opening 86 (e.g., the intake manifold 34). Similar to the first valve 98, the illustrated valve 110 is an automatically controlled butterfly valve. However, in alternative implementations, different types of valves may be used. In still other implementations, the valve may be mechanically operated.

During use, the second valve 110 is adjustable between an open configuration (see FIG. 3), in which the first end 114 is in fluid communication with the second end 118 via the valve (e.g., the valve gate is open), and a closed configuration (see FIG. 4), in which the first end 114 is not in fluid communication with the second end 118 via the valve (e.g., the valve gate is closed). Generally speaking, the second valve 110 is configured to act as a CTIS feed valve to help re-direct the airflow discharged from the compressor assembly 46 to the CTIS 26 (described below).

While not illustrated, the manifold 42 of the EAS 30 may also include a third valve configured to control the flow of air through the fourth opening 90 (e.g., to the CTIS 26). In such implementations, the third valve may be operable independently of the first valve 98 and the second valve 110 and be used to isolate the CTIS 26 from the compressor assembly 46 when the CTIS 26 is not in use.

While the illustrated manifold 42 is presented for use together with the electrically assisted compressor assembly 46, it is to be understood that in other implementations the manifold 42 may be used together with any forced air intake system (e.g., a turbocharger, supercharger, and the like). In such implementations, the manifold 42 is configured to selectively direct the compressed air output by the forced air intake system to both the ICE 22 (e.g., via the intake manifold 34) and the CTIS 26.

During use, the EAS 30 is operable in a passive mode, an engine boost mode, a CTI boost mode, and a CTI recirculating boost mode. In the passive mode (see FIG. 2), the bypass valve 98 is in the open configuration, and the motor 58 is in the deactivated mode. With the bypass valve 98 in the open configuration, the airflow (A1) from the primary intake system 44 (e.g., from the second opening 82) is directed bypasses the compressor assembly 46 and is fed directly to the cylinders of the ICE 22 via the intake manifold 34 (e.g., through the third opening 86). When the EAS 30 is in the passive mode, the primary intake system 44 controls the flow of air into the ICE 22.

In the engine boost mode (see FIG. 3), the bypass valve 98 is in the closed configuration, the CTIS feed valve 110 is in the open configuration, and the motor unit 58 is in the activated mode causing the compressor wheel 54 to rotate relative to the compressor housing 50. With the valves 98, 110 in the engine boost mode, the outlet 66 of the compressor assembly 46 is in fluid communication with both the intake manifold 34 (i.e., the cylinders of the ICE 22) and the CTIS 26.

Figure 3:
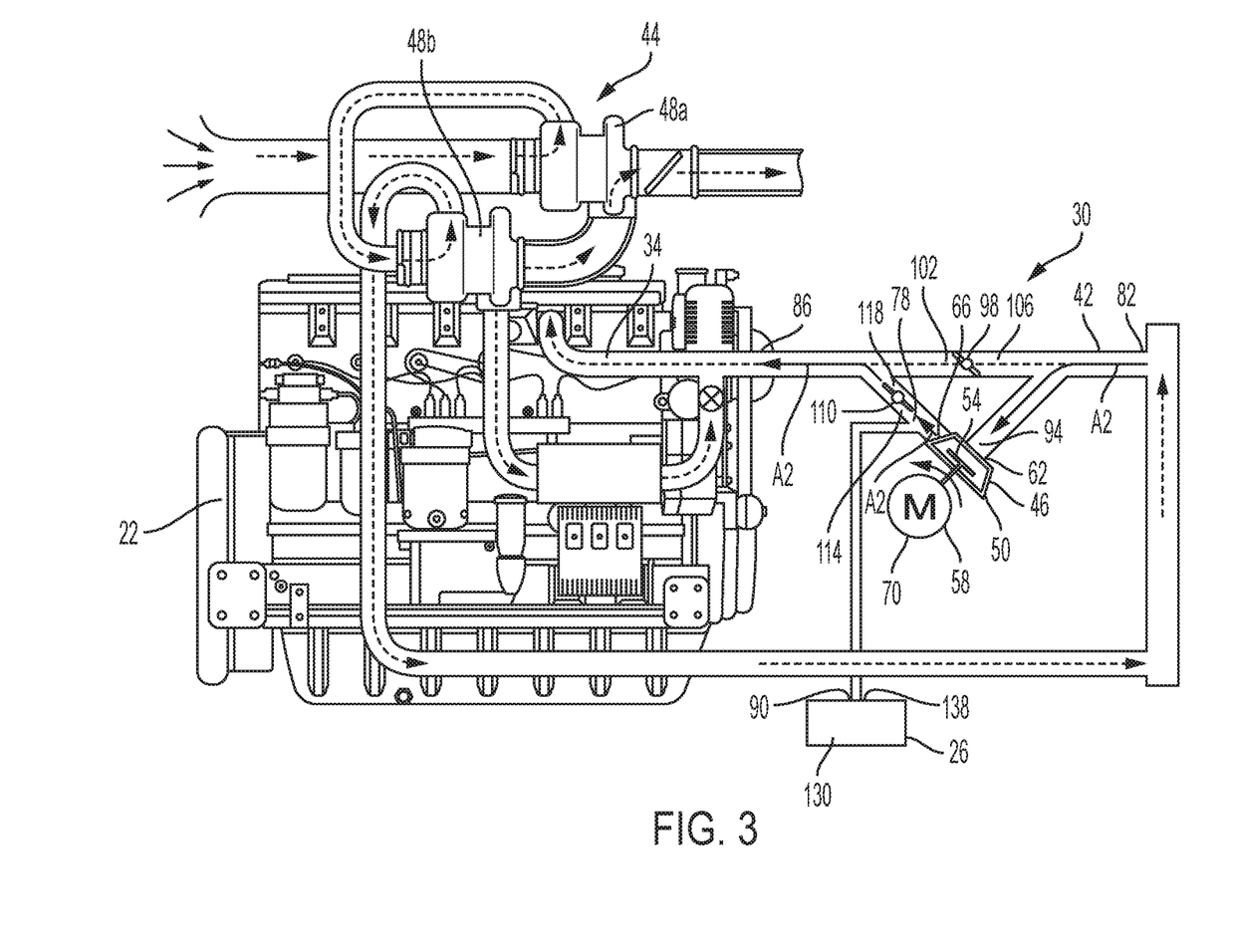
FIG. 3 is a schematic of the EAS of FIG. 1 in an engine boost mode.

With the bypass valve 98 in the closed configuration, the airflow (A2) from the primary intake system 44 (e.g., via the second opening 82) is directed into the compressor assembly 46 via the compressor inlet 62. Upon entering the compressor assembly 46, the airflow (A2) is further compressed to a first pressure greater than atmospheric pressure and directed through the open CTIS feed valve 110 and into the intake manifold 34 of the ICE 22. While operating in the engine boost mode, the compressor assembly 46 is able to supplement the primary intake system 44 by providing additional boost in instances where the airflow provided by the primary intake system 44 is not sufficient (e.g., to compensate for turbo lag and the like). The level of additional boost provided by the compressor assembly 46 can be dictated by a controller (not shown) by altering the speed at which the compressor wheel 54 rotates relative to the compressor housing 50, as described above.

In the CTI boost mode (see FIG. 4), the bypass valve 98 is in the open configuration, the CTIS feed valve 110 is in the closed configuration, and the motor unit 58 is in the activated mode causing the compressor wheel 54 to rotate relative to the compressor housing 50. With the valves 98, 110 in the CTI boost mode, the outlet 66 of the compressor assembly 46 is in fluid communication with the CTIS 26 and is not in fluid communication with the intake manifold 34.

Figure 4:
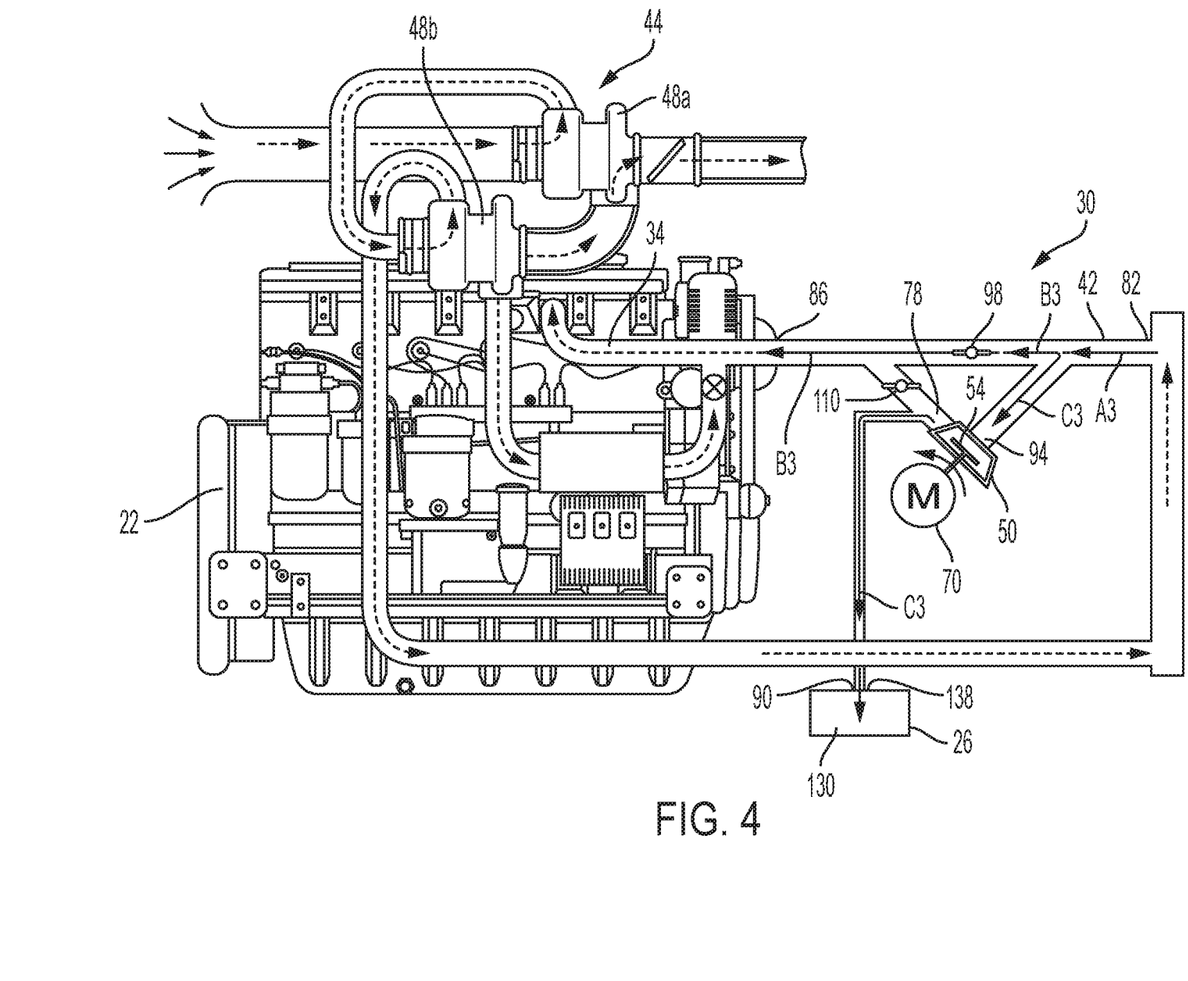
FIG. 4 is a schematic of the EAS of FIG. 1 in a CTIS boost mode.

With both the bypass valve 98 open and the motor unit 58 activated, the airflow (A3) entering the manifold 42 via the primary intake system 44 (e.g., through the second opening 82) is split such that a first portion (B3) bypasses the compressor assembly 46 and is directed into the intake manifold 34 of the ICE 22 while a second portion (C3) of the airflow is directed through the compressor assembly 46 and on to the CTIS 26. More specifically, the second portion (C3) of the airflow flows into the compressor inlet 62 where it is further compressed via the rotation of the compressor wheel 54 relative to the compressor housing 50 and is directed to the CTIS 26 via the closed CTIS feed valve 110. Due to the independent electrical operation of the compressor assembly 46, the compressor assembly 46 is able to provided compressed air to the CTIS 26 even when the ICE 22 is not operating (e.g., when the primary intake system 44 is not supplying compressed air to the manifold 42). In such implementations, the operation of the compressor assembly 46 alone draws air into the manifold 42.

In the CTI recirculating boost mode (see FIG. 5), the bypass valve 98 is in the open configuration, the CTIS feed valve 110 is in the open configuration, and the motor unit 58 is in the activated mode causing the compressor wheel 54 to rotate relative to the compressor housing 50. With the valves 98, 110 in the CTI boost mode, the outlet 66 of the compressor assembly 46 is in fluid communication with the CTIS 26 and the inlet 62 of the compressor assembly 46.

Figure 5:
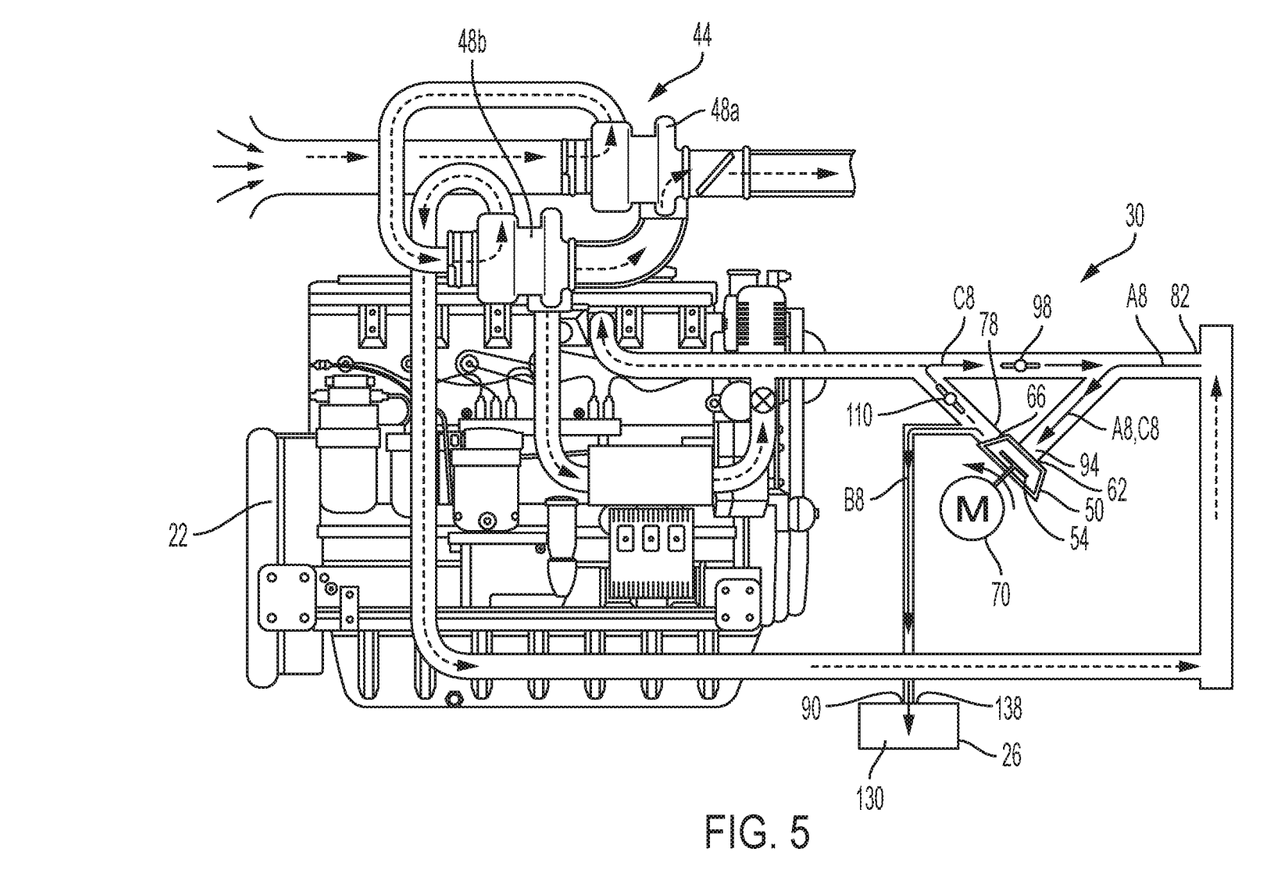
FIG. 5 is a schematic of the EAS of FIG. 1 in a CTIS recirculating boost mode.

With the bypass valve 98 open, the CTIS feed valve 110 open, and the motor unit 58 activated, the airflow (A8) entering the manifold 42 via the primary intake system 44 (e.g., through the second opening 82) is directed into the inlet 62 of the compressor assembly 46. The airflow is then compressed via rotation of the compressor wheel 54 relative to the compressor housing 50 and is exhausted through the outlet 66. After leaving the outlet 66, the airflow is split such that a first portion (B8) is directed into the CTIS 26 while a second portion (C8) is recirculated to the inlet 62 of the compressor. More specifically, the second portion (C8) flows through the open CTIS feed valve 110, flows through the bypass valve 98, and merges with the initial airflow (A8). The combined airflow then re-enters the inlet 62 of the compressor assembly 46 where it is further compressed and re-exhausted through the outlet 66. By re-circulating a portion of the airflow (C8) through the compressor assembly 46, a higher level of boost can be provided to the CTIS 26 and potential surge conditions can be avoiding by allowing a larger volume of air to pass through the compressor assembly 46 during use. This is particularly useful in instances where the ICE 22 has little to no airflow entering therein (e.g., when the ICE 22 is either not operating or operating at low throttle conditions).

As shown in FIG. 1, the CTIS 26 includes a secondary air compressor 122, a reservoir tank 126, and a CTI manifold 130 in fluid communication with and extending between the EAS 30, the reservoir tank 126, and the secondary air compressor 122. During use, the CTIS 26 is configured to monitor and adjust the air pressure within each of the pneumatic wheels 18 of the vehicle 10.

The secondary air compressor 122 operates independently of the compressor assembly 46 and the ICE 22 and includes an outlet 134 where compressed air is discharged. The secondary air compressor 122 may include, but is not limited to, electrically powered air compressors, PTO driven air compressor, and the like.

The CTI manifold 130 includes a series of passageways and valves configured to control the flow of air between each of the pneumatic wheels 18, the secondary air compressor 122, the reservoir tank 126, and the EAS 30. The CTI manifold 130 includes a first opening or passageway 138 open to and in fluid communication with the fourth opening or passageway 90 of the EAS manifold 42, a second opening or passageway 142 open to and in fluid communication with the outlet 134 of the secondary air compressor 122, a third opening or passageway 144 open to and in fluid communication with the reservoir tank 126, and a plurality of wheel openings or passageways 146 each of which correspond to and are in fluid communication with one or more corresponding pneumatic wheels 18. In the illustrated implementation, the CTI manifold 130 is configured such that the flow of air can be controlled through each of the wheel openings 146 individually.

During use, the CTI manifold 130 is configured to direct air into and allow air to escape from each of the individual pneumatic wheels 18. To increase the air pressure within a particular wheel 18, the CTI manifold 130 is configured to adjust the valves therein to direct compressed air from the EAS 30, the secondary air compressor 122, the reservoir tank 126, or some combination thereof into the desired wheel. When filing the wheels 18, the CTI manifold 130 is able to supplement the volumetric output of the secondary air compressor 122 with that of the EAS 30 to allow for more quick and efficient tire filing. In contrast, to reduce the air pressure within a particular wheel 18, the CTI manifold 130 is configured to adjust the valves therein to vent a particular wheel opening 146 to the atmosphere allowing the air within the wheel 18 to escape. In still other operating modes, the CTI manifold 130 may be configured to direct compressed air from the EAS 30 to the reservoir tank 126 to charge the tank 126 for future use.

While driving the vehicle 10, the user typically operates the EAS 30 in one of the passive mode and the engine boost mode. As described above, in both instances air is directed from the primary intake system 44 to the intake manifold 34 of the ICE 22 to allow operation thereof. More specifically, the engine boost mode may be entered to allow the compressor assembly 46 to supplement the flow of intake air provided by the primary intake system 44, while the passive mode may be entered when supplemental boost is not required and the airflow provided by the primary intake system 44 is sufficient for ICE 22 operations.

To increase the air pressure within one or more of the pneumatic wheels 18, the EAS 30 may enter the CTI boost mode (see FIG. 4). To do so, the EAS 30 adjusts the bypass valve 98 into the open configuration, adjusts the CTIS feed valve 110 to the closed configuration, and activates the motor unit 58 causing the compressor wheel 54 to rotate relative to the compressor housing 50. As described above, a first portion (B3) of the airflow is allowed to bypass the compressor assembly 46 and flow into the intake manifold 34 of the ICE 22. This bypass airflow (B3) assures the ICE 22 can continue to operate when the EAS 30 is in the CTI boost mode.

With the EAS 30 in the CTI boost mode, a second portion (C3) of the airflow is further compressed by the compressor assembly 46 and subsequently directed to the CTI manifold 130 via the fourth opening 90. The CTIS 26 then utilizes the compressed air provided therefrom to fill the pneumatic wheel 18 as described above. More specifically, the air provided by the EAS 30 supplements the compressed air provided by the secondary air compressor 122 to more quickly and efficiently fill the pneumatic wheels 18. This capability is particularly useful for use with tractors where wheel pressure often needs to be changed between on-road and off-road driving and the wheels themselves are large—requiring a large volume of air to adjust the pressure therein. In alternative implementations, the CTIS 26 may rely solely on the EAS 30 for compressed air.

After the wheels 18 have reached the desired pressure, the CTIS 26 stops the flow of air to the relevant wheels 18 and the EAS 30 exits the CTI boost mode. The EAS 30 may then return to either the passive or engine boost modes of operation.

FIGS. 8-11 illustrate another embodiment of the EAS 1030. The EAS 1030 is substantially similar to the EAS 30 described above. As such, only the differences will be described herein. The EAS 1030 includes a dual-stage compressor assembly 1046, and a manifold 1042.

The dual stage compressor assembly 1046 includes a first compressor stage 1500, a second compressor stage 1504, and a motor unit 1058 in operable communication with and configured to selectively drive both the first compressor stage 1500 and the second compressor stage 1504. Each compressor stage 1500, 1504, in turn, includes a compressor inlet 1062 and a compressor outlet 1066.

The dual-stage compressor assembly 1046 also includes a clutch 1520 positioned between and configured to selectively transmit torque between the motor 1058 and the second compressor stage 1504. The clutch 1520, in turn, is operable in an engaged configuration, in which the motor 1058 is in operable communication with the second compressor stage 1504 (e.g., rotation of the motor 1058 drives the second compressor stage 1504), and a disengaged configuration, in which the motor 1058 is not in operable communication with the second compressor stage 1504 (e.g., rotation of the motor 1058 is not transmitted to the second compressor stage 1504).

The manifold 1042 of the EAS 1030 includes a first opening or passageway 1524 open to and in fluid communication with the primary intake system 44, a second opening or passageway 1528 open to and in fluid communication with the inlet 1062 of the first compressor stage 1500, a third opening or passageway 1532 open to and in fluid communication with the outlet 1066 of the first compressor stage 1500, a fourth opening or passageway 1536 open to and in fluid communication with the outlet 1066 of the second compressor stage 1504, a fifth opening or passageway 1540 open to and in fluid communication with the intake manifold 34 of the ICE 22, and a sixth opening or passageway 1544 open to and in fluid communication with the CTIS 26.

The manifold 1042 also includes a first or bypass valve 1548 having a first end 1552 in fluid communication with the second opening 1528 (e.g., the inlet 1062 of the first compressor stage 1500) and the first opening 1524 (e.g., the primary intake system 44). The first valve 1548 also includes a second end 1556 in fluid communication with the third opening 1532 (e.g., the outlet 1066 of the first compressor stage 1500) and the fifth opening 1540 (e.g., the intake manifold 34). During use, the first valve 1548 is adjustable between an open configuration (see FIG. 8), in which the two ends 1552, 1556 are in fluid communication with one another via the valve 1548, and a closed configuration (see FIG. 9), in which the two ends 1552, 1556 are not in fluid communication with one another via the valve 1548.

The manifold 1042 also includes a second or second stage activation valve 1560. The second valve 1560 includes a first end 1564 in fluid communication with the third opening 1532 (e.g., the outlet 1066 of the first compressor stage 1500), and a second end 1568 in fluid communication with the fifth opening 1540 (e.g., the intake manifold 34). The second valve 1560 is adjustable between an open configuration (see FIG. 9), in which the two ends 1564, 1568 are in fluid communication with one another via the valve 1560, and a closed configuration (see FIG. 10), in which the two ends 1564, 1568 are not in fluid communication with one another via the valve 1560.

The manifold 1042 also includes a third or CTIS feed valve 1572. The CTIS feed valve 1572 includes a first end 1576 in fluid communication with the fifth opening 1540 (e.g., the intake manifold 34), and a second end 1580 in fluid communication with the sixth opening 1544 (e.g., the CTIS 26) and the outlet 1066 of the second compressor stage 1504. The third valve 1572 is adjustable between an open configuration (see FIG. 10), in which the two ends 1576, 1580 are in fluid communication with one another via the valve 1572, and a closed configuration (see FIG. 11), in which the two ends 1576, 1580 are not in fluid communication with one another via the valve 1572.

During operation, the EAS 1030 is operable in a passive mode, a first engine boost mode, a second engine boost mode, and a CTIS boost mode. In the passive mode (see FIG. 8), the bypass valve 1548 is in the open configuration and the motor 1058 is in the deactivated configuration. With the bypass valve 1548 in the open configuration, the airflow (A4) from the primary intake system 44 (e.g., via the first opening 1524) is allowed to bypass both stages 1500, 1504 of the compressor assembly 1046 and is fed directly into the intake manifold 34 of the ICE 22 (e.g., via the fifth opening 1540). When the EAS 1030 is in the passive mode, the primary intake system 44 establishes the flow of air into the ICE 22.

In the first engine boost mode (see FIG. 9), the bypass valve 1548 is in the closed configuration, the second stage activation valve 1560 is in the open configuration, the motor 1058 is in the activated mode, and the clutch 1520 is in the disengaged configuration. With the clutch 1520 in the disengaged configuration, operation of the motor 1058 drives the first compressor stage 1500 but does not drive the second compressor stage 1504. By doing so, parasitic load on the motor 1058 is minimized since the second compressor stage 1504 is not in use during the first engine boost mode.

Figure 9:
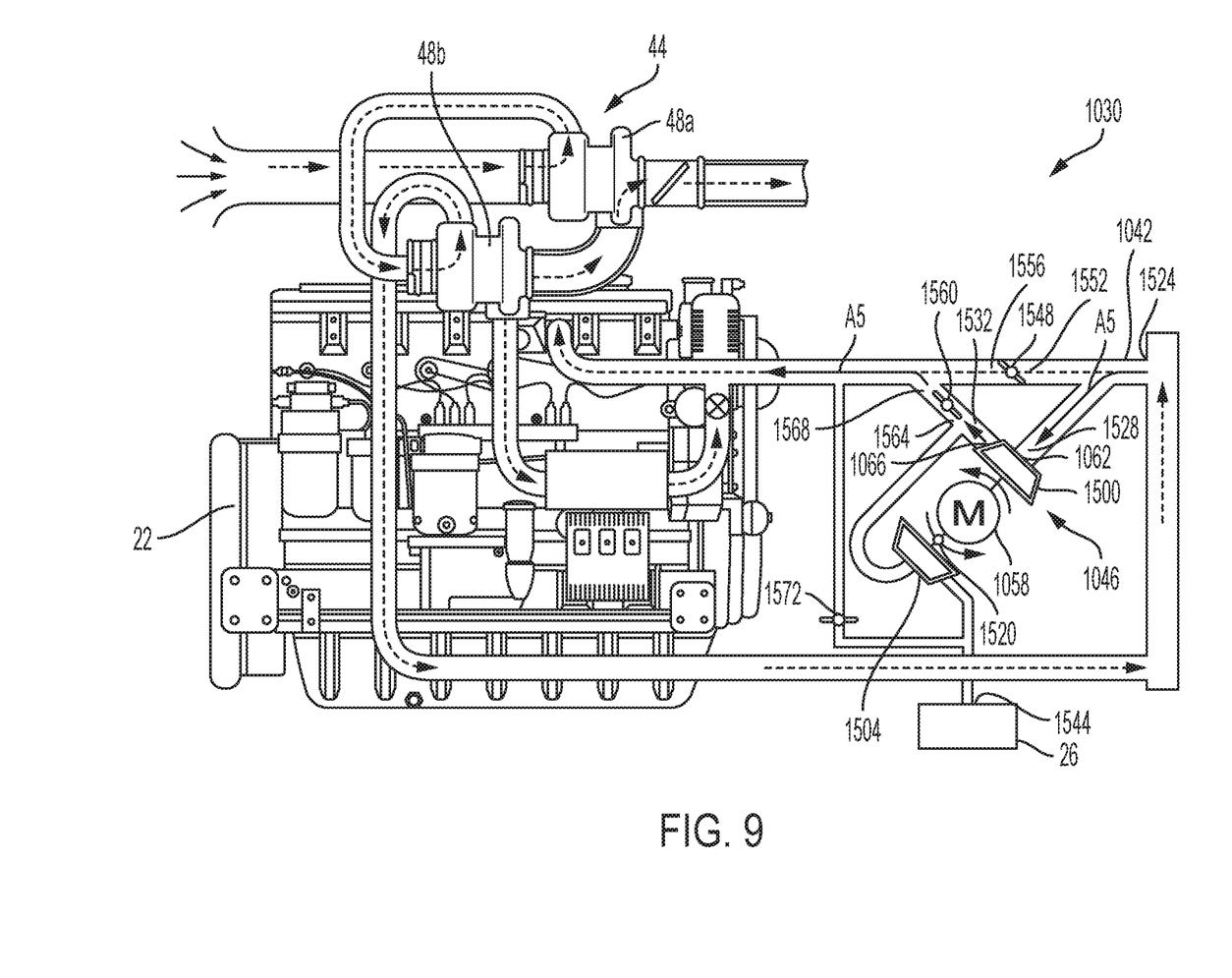
FIG. 9 is a schematic of the EAS of FIG. 8 in a first engine boost mode.

With the bypass valve 1548 in the closed configuration, the airflow (A5) fed into the manifold 1042 from the primary intake system 44 (e.g., via the first opening 1524) is directed into the first compressor stage 1500. Upon entering the first compressor stage 1500, the airflow (A5) is further compressed and directed through the open second stage activation valve 1560 and into the intake manifold 34 of the ICE 22. By doing so, the compressor assembly 46 is able to supplement the primary intake system 44 by providing additional boost in instances where the airflow provided by the primary intake system 44 is not sufficient (e.g., to compensate for turbo lag and the like). The magnitude of supplemental boost provided by the compressor assembly 46 can be dictated by a controller (not shown) by altering the speed of the motor 1058, as described above.

In the second engine boost mode (see FIG. 10), the bypass valve 1548 is in the closed configuration, the second stage activation valve 1560 is in the closed configuration, the CTIS feed valve 1572 is in the open configuration, the motor 1058 is in the activated mode, and the clutch 1520 is engaged. With the motor 1058 activated and the clutch 1520 engaged, both the first and second stages 1500, 1504 of the compressor assembly 1046 are driven by the motor 1058.

Figure 10:
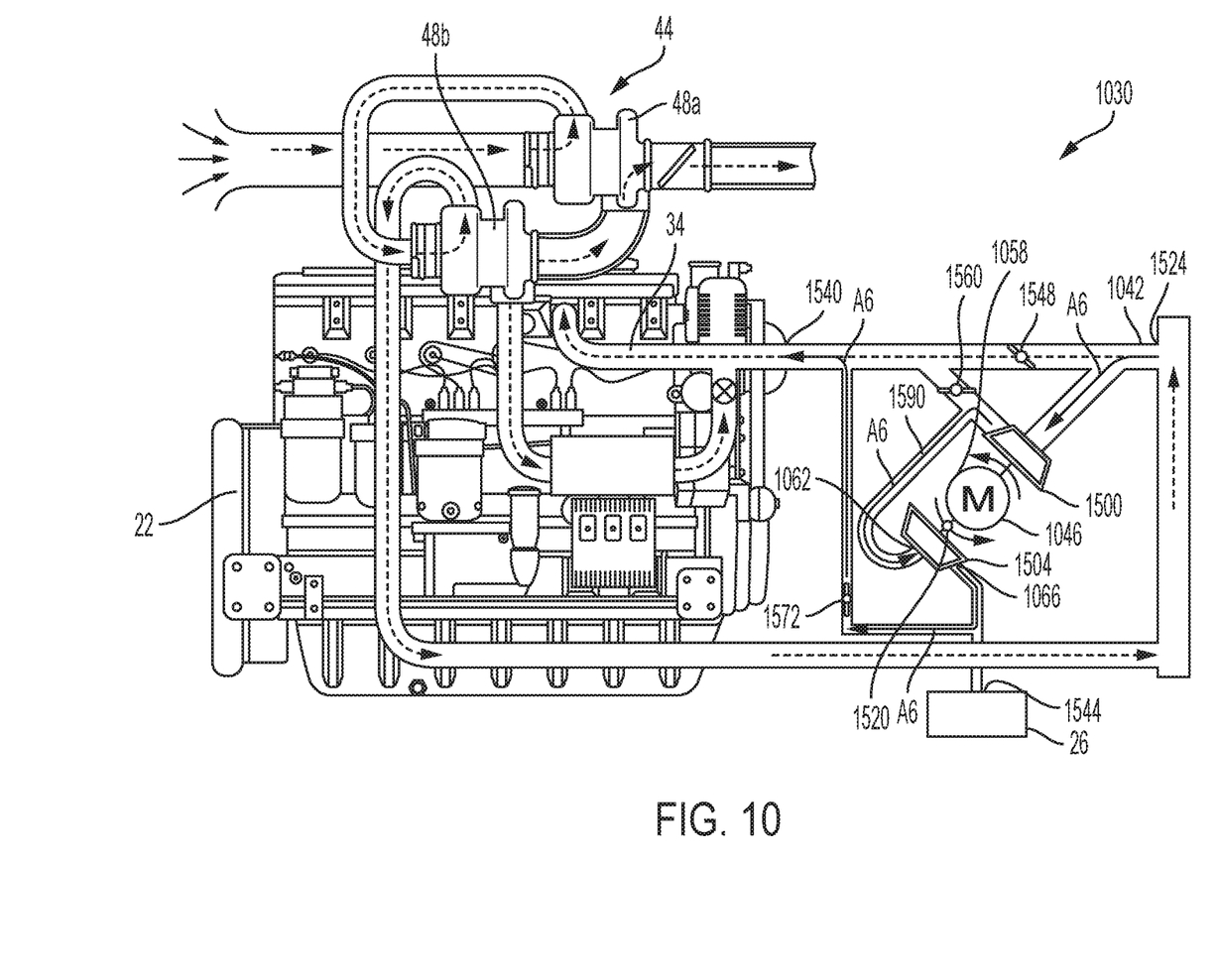
FIG. 10 is a schematic of the EAS of FIG. 8 in a second engine boost mode.
Figure 11:
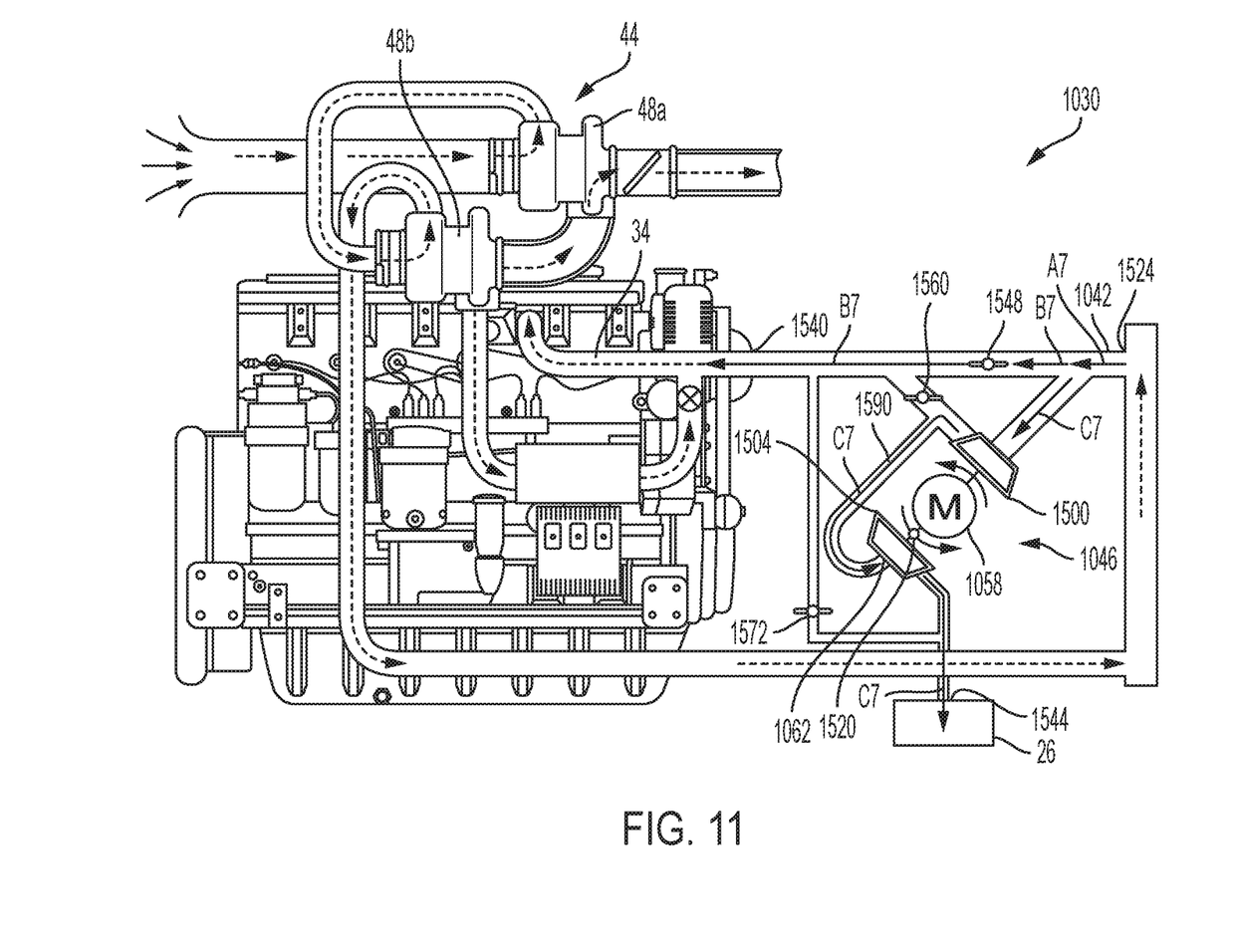
FIG. 11 is a schematic of the EAS of FIG. 8 is a CTIS boost mode.

With the bypass valve 1548 in the closed configuration, the airflow (A6) fed into the manifold 1042 from the primary intake system 44 (e.g., via the first opening 1524) is directed into the first compressor stage 1500. Upon entering the first compressor stage 1500, the airflow (A6) is compressed and exhausted into the interstage portion 1590 of the manifold 1042. The airflow (A6) is then directed into the inlet 1062 of the second compressor stage 1504 via the closed second stage activation valve 1560. Upon entering the second compressor stage 1504, the airflow (A6) is compressed even further and passes through the open CTIS feed valve 1572 and to the intake manifold 34. The second engine boost mode allows the EAS 30 to further supplement the airflow of the primary intake system 44 beyond the levels capable during the first engine boost mode through the use of both stages 1500, 1504 of the compressor assembly 1046.

In the CTI boost mode (see FIG. 11), the bypass valve 1548 is in the open configuration, the second stage activation valve 1560 is in the closed configuration, the CTIS feed valve 1572 is in the closed configuration, the motor 1058 is in the activated mode, and the clutch 1520 is in the engaged configuration. As described above, with the motor 1058 activated and the clutch 1520 engaged, both the first and second stages 1500, 1504 of the compressor assembly 1046 are driven by the motor 1058.

With both the bypass valve 1548 open and the motor unit 1058 on, the airflow (A7) entering the manifold 1042 via the primary intake system 44 is split such that a first portion (B7) bypasses the compressor assembly 1046 and is directed into the intake manifold 34 of the ICE 22 while a second portion (C7) of the airflow is directed to the compressor assembly 1046. Upon entering the first compressor stage 1500 of the compressor assembly 1046, the airflow (C7) is compressed and exhausted into the interstage portion 1590 of the manifold 1042. The airflow (C7) is then directed into the inlet 1062 of the second compressor stage 1504 via the closed second stage activation valve 1560 where it is compressed even further. Finally, the airflow (C7) leaves the second compressor stage 1504 and is directed to the CTIS 26 via the closed CTIS feed valve 1572. The CTI boost mode in FIG. 11 allows the EAS 1030 to provide a large volume of air at a high pressure to the CTIS 26 by utilizing both stages of the compressor assembly 1046.

While driving the vehicle 10, the user typically operates the EAS 30 in one of the passive mode, the first engine boost mode, and the second engine boost mode. When changes in wheel pressure are required, the EAS 30 changes to the CTI boost mode to supplement CTIS operation, as described above.

Figure 12:
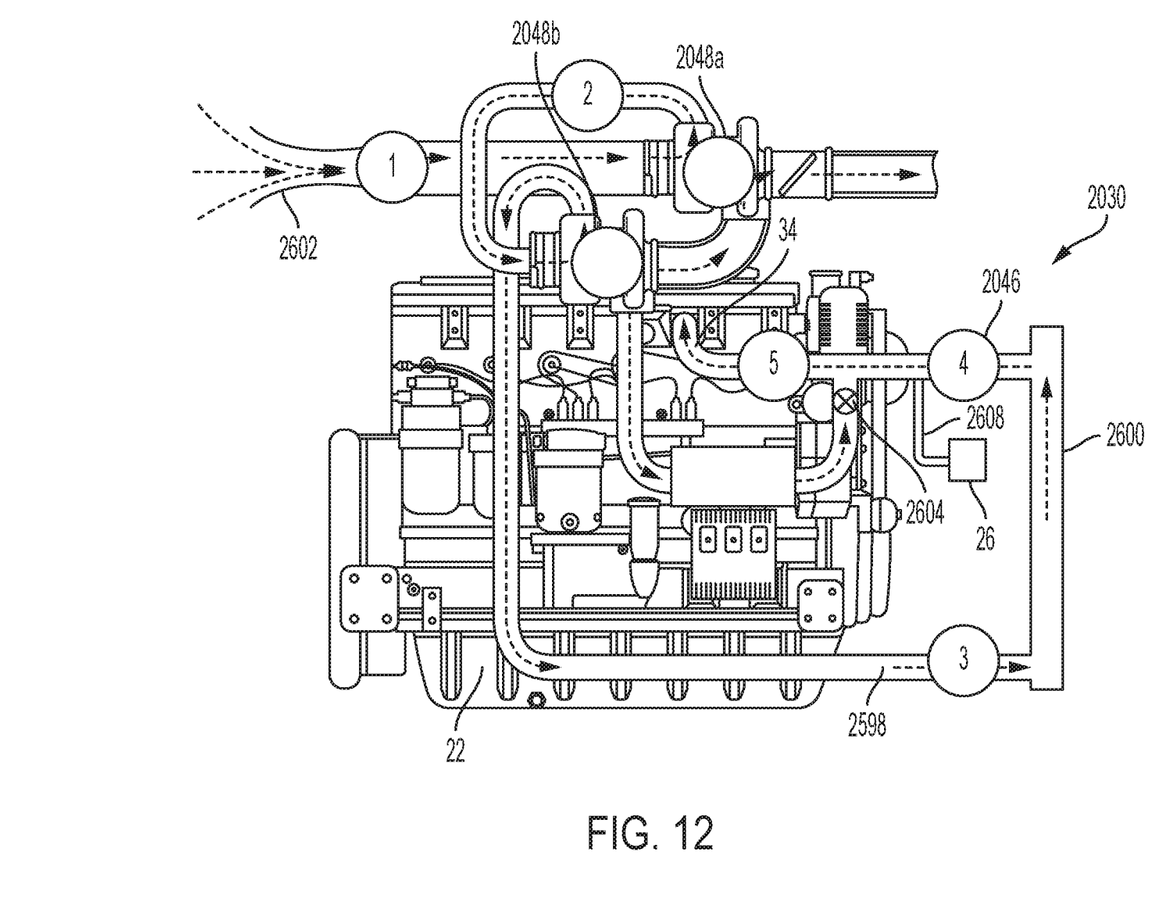
FIG. 12 is a schematic of another implementation of an EAS.

FIG. 12 illustrates another embodiment of the EAS 2030. The EAS 2030 is substantially similar to the EAS 30 described above. More specifically, FIG. 12 illustrates various locations (positions 1-5) where an electrically assisted compressor assembly 2046 may be positioned along the intake fluid path 2598 of the ICE 22. For the purposes of this application, the intake fluid path 2598 is generally defined as the fluid path originating at each of the one or more cylinders of the ICE 22 and extending upstream to the intake location 2602 where ambient air is drawn into the overall ICE 22 system.

As shown in FIG. 12, the compressor assembly 2046 may be positioned, but is not limited to: upstream of the low-pressure turbocharger 2048a (see position 1), between the low-pressure turbocharger 2048a and the high-pressure turbocharger 2048b (see position 2), downstream of the high-pressure turbocharger 2048b but upstream of the intercooler 2600 (see position 3), downstream of the intercooler 2600 but upstream of the EGR valve 2604 (see position 4), and/or downstream of the EGR valve 2604 (see position 5).

In still other implementations, the electrically assisted compressor assembly 2046 may be incorporated into at least one of the low-pressure turbocharger 2048a and the high-pressure turbocharger 2048b. In such implementations, the electrically assisted compressor assembly 2046 may also include a turbine (not shown) to further assist the rotation of the compressor wheel relative to the compressor housing. For the purposes of this subsection, the compressor assembly 2046 is presumed located at position 4, downstream of the intercooler 2600 but upstream of the EGR valve 2604.

The EAS 2030 also includes a feed line 2608 extending between and in fluid communication with the intake fluid path 2598 and the CTIS 26. The feed line 2608 is positioned downstream of the compressor assembly 2046 and configured to direct at least a portion of the airflow exhausted therefrom to the CTIS 26. In the illustrated implementation, no valves are present to re-direct airflow from the intake fluid path 2598 and into the feed line 2608. As such the CTIS 26, the compressor assembly 2046 and the intake manifold 34 are all in constant fluid communication with one another. Due to this layout, the EAS 2030 relies upon the relative high pressure region created by the compressor assembly 2046 to produce the desired airflow characteristics (e.g., into both the CTIS 26 and the intake manifold 34). However, in alternative implementations, one or more valves (e.g., such as a three-way valve, not shown) may be used.

The invention claimed is:

1. A vehicle having one or more inflatable wheels, the vehicle comprising:
   an internal combustion engine including a cylinder and an exhaust manifold in fluid communication with the cylinder;
   a tire inflation system in fluid communication with and configured to selectively direct compressed air into at least one wheel of the one or more inflatable wheels;
   a compressor assembly having a first outlet, wherein the compressor assembly includes an electric motor, and wherein the electric motor rotates a compressor wheel relative to a compressor housing independent of the operation of the internal combustion engine,
   a turbocharger driven by the exhaust manifold and having a second outlet configured to output a compressed airflow;
   wherein the vehicle is operable in a first mode, in which the first outlet is in fluid communication with the cylinder of the internal combustion engine, and a second mode, in which the first outlet is in fluid communication with the tire inflation system and the second outlet is in fluid communication with and discharging the compressed airflow into the cylinder of the internal combustion engine.

2. The vehicle of claim 1, wherein the compressor assembly includes a compressor housing including the first outlet, and a compressor wheel positioned at least partially within and rotatable with respect to the compressor housing, and wherein the compressor wheel is rotatable relative to the compressor housing.

3. The vehicle of claim 1, wherein the compressor assembly includes an inlet, and wherein the vehicle includes a bypass extending between the compressor inlet and the first outlet of the compressor assembly, and wherein the bypass is adjustable between an open configuration, in which air can flow through the bypass, and a closed configuration, in which air cannot flow through the bypass.

4. The vehicle of claim 1, wherein the first outlet is in fluid communication with both the tire inflation system and the cylinder in the first mode.

5. The vehicle of claim 1, wherein the first outlet is not in fluid communication with the cylinder in the second mode.

6. The vehicle of claim 1, further comprising a first valve having a first opening in fluid communication with the first outlet of the compressor assembly and a second opening in fluid communication with the cylinder, and wherein the first valve is adjustable between an open position, in which the first opening is in fluid communication with the second opening, and a closed position, in which the first opening is not in fluid communication with the second opening.

7. The vehicle of claim 6, wherein the compressor assembly includes an inlet, the vehicle further comprising a second valve having a first opening in fluid communication with the inlet and a second opening in fluid communication with the first outlet, and wherein the second valve is adjustable between an open position, in which the first opening is in fluid communication with the second opening, and a closed position, in which the first opening is not in fluid communication with the second opening.

8. The vehicle of claim 7, wherein the first valve is in the open configuration and the second valve is in the closed configuration during the first mode.

9. The vehicle of claim 1, further comprising a manifold including
   a first passageway configured to be open to and in fluid communication with the cylinder of the internal combustion engine,
   a second passageway configured to be open to and in fluid communication with the tire inflation system, a first valve having a first opening in constant fluid communication with an inlet of the compressor assembly, and a second opening in constant fluid communication with the first passageway, wherein the first valve is adjustable between an open configuration, in which the first opening is in fluid communication with the second opening, and a closed configuration, in which the first opening is not in fluid communication with the second opening, a second valve having a third opening in constant fluid communication with the first outlet of the compressor assembly, and a fourth opening in constant fluid communication with the first passageway, wherein the second valve is adjustable between an open configuration, in which the third opening is in fluid communication with the fourth opening, and a closed configuration, in which the third opening is not in fluid communication with the fourth opening, and wherein the second passageway is in fluid communication with the first outlet of the compressor assembly.

10. The vehicle of claim 9, wherein the the first valve is in the open configuration and the second valve is in the open configuration when the vehicle is operating in the first mode, wherein the first valve is in the closed configuration and the second valve is in the open configuration when the vehicle is operating in a third mode, and wherein the first valve is in the open configuration and the second valve is in the closed configuration when the vehicle is operating in the second mode.

11. The vehicle of claim 10, wherein the compressor wheel is driven relative to the compressor housing when the vehicle is in the second mode and the third mode.

12. The vehicle of claim 10, wherein the compressor wheel is not driven relative to the compressor housing when the vehicle is in the first mode.

13. The vehicle of claim 9, wherein the manifold includes a third passageway configured to be placed in fluid communication with the second outlet of the turbocharger, and wherein the third passageway is in fluid communication with the inlet of the compressor assembly.

14. The vehicle of claim 13, wherein the third passageway is in fluid communication with the first opening of the first valve.

15. The vehicle of claim 13, wherein the third passageway is in fluid communication with the first outlet of the compressor assembly.

16. A vehicle having one or more inflatable wheels, the vehicle comprising:
an internal combustion engine including a cylinder;
a tire inflation system in fluid communication with and configured to selectively direct compressed air into at least one wheel of the one or more inflatable wheels;
a compressor assembly having a first outlet, wherein the compressor assembly includes an electric motor, and wherein the electric motor rotates the compressor wheel relative to the compressor housing independent of the operation of the internal combustion engine,
a turbocharger driven by the exhaust manifold and having a second outlet;
wherein the vehicle is operable in a first mode, in which the first outlet is in fluid communication with the cylinder of the internal combustion engine, and a second mode, in which the first outlet is in fluid communication with the tire inflation system and not in fluid communication with the cylinder of the combustion engine, and the second outlet is in fluid communication with the cylinder of the internal combustion engine.

* * * * *